UNITED STATES PATENT OFFICE.

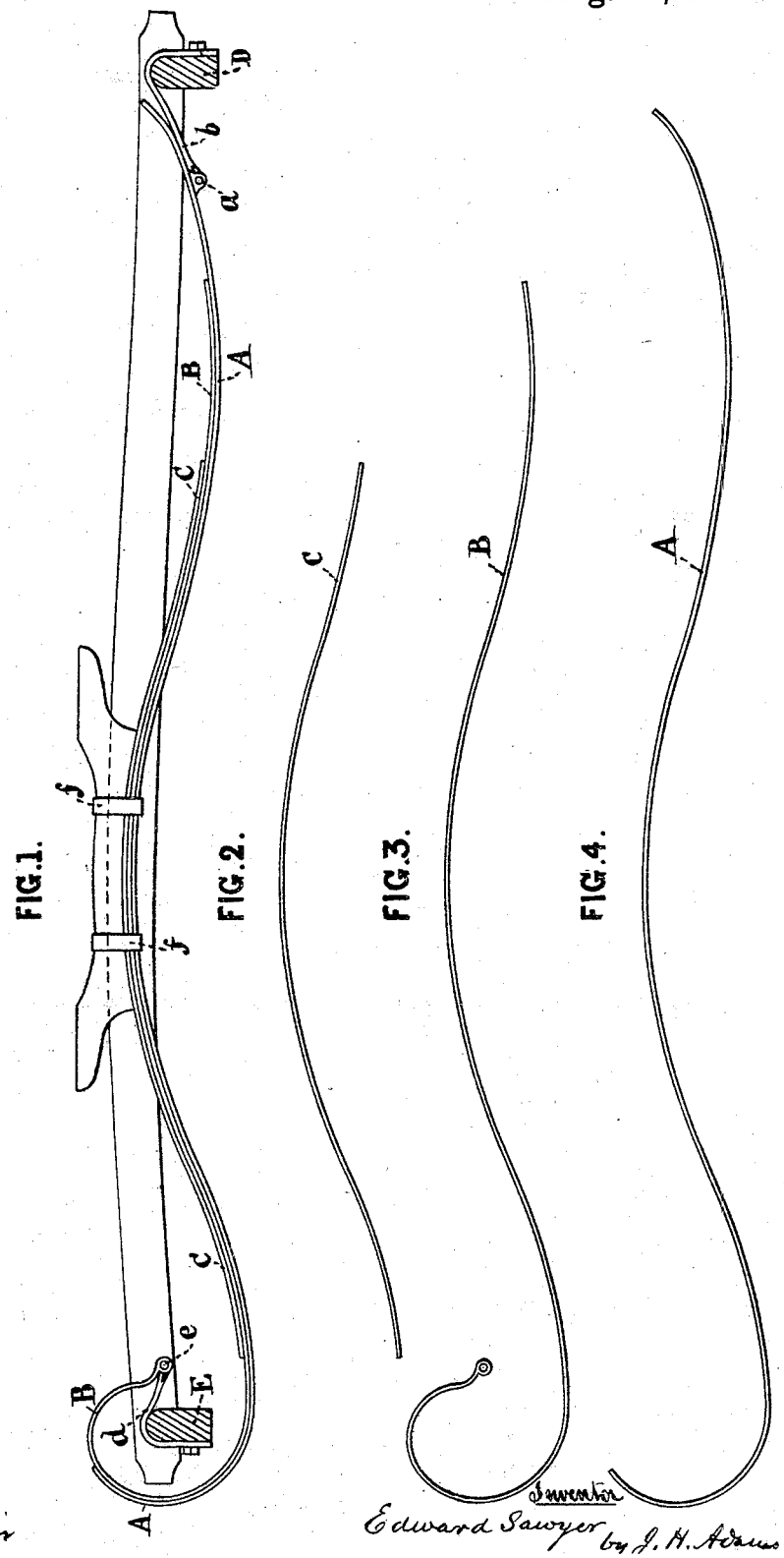

EDWARD SAWYER, OF BRIDGEWATER, MASSACHUSETTS.

CARRIAGE-SPRING.

SPECIFICATION forming part of Letters Patent No. 263,061, dated August 22, 1882.

Application filed May 16, 1882. (No model.)

*To all whom it may concern:*

Be it known that I, EDWARD SAWYER, of Bridgewater, in the county of Plymouth and State of Massachusetts, have invented a new and useful Improvement in Carriage-Springs, of which the following is a specification.

The object of my invention is to produce a spring for vehicles which shall combine the advantages of the long side spring in addition to those of the C-spring; and the invention consists in combining a long side spring and a thorough-brace or swinging attachment to a rigid side-bar running-gear with a C-spring so that they shall coact to produce the desired result.

Inasmuch as, other conditions being the same, the longer the spring the easier the motion communicated to the body by the motion of the running-gear to which it is attached, it becomes desirable to make a spring at the same time much longer than the short side spring heretofore combined with a thorough-brace or link attachment to running-gear and retain such relation of the curves and their proportions as the strength of material and laws of symmetry require.

Referring to the accompanying drawings, Figure 1 is a side elevation of a spring illustrating my invention, and showing its points of connection with the vehicle-body. Figs. 2, 3, and 4 show the separate leaves of the spring.

A represents the lower leaf or spring, and is connected at its forward end by means of a strap, $b$, attached by lugs $a$ to the forward cross-bar, D. The rear end of the leaf A is curved upward, and extends sufficiently far over the second leaf to be supported thereby and insured against slipping down over the same. These leaves may be secured together by a clip, if found necessary.

B represents a second leaf or spring laid upon the leaf A, commencing at a point near the front bearing of the same, and, extending to the rear, terminates in a C-spring, which is attached by a link or strap to the bed-piece E.

F represents one of the side bars.

As a re-enforce, I place upon the spring B a third leaf or spring, C, of about the comparative length shown in the drawings. More than one additional spring may be employed, if found desirable. The several springs or leaves are secured to the body of the vehicle by means of straps $ff$ or by bolts in any suitable manner.

The leaf or spring A may be omitted and the leaf or spring B be extended at the forward end and attached to the thorough-brace $b$ in the same way as shown in connection with spring A.

By recurving the long spring into the C-spring at the rear end the center of the combined C and elliptical springs is brought much nearer to the rear axle, and under the center of gravity of the wagon or vehicle-body, thus avoiding the tendency to tilt backward when loaded.

By means of my invention I secure the easy motion of a long side spring with the swinging motion of the ordinary thorough-brace attached to a rigid side-bar running-gear, thus giving free motion in all directions and avoiding any sudden jar given to the spring when immediately connected with the gear, such jar rendering the spring liable to break at its C curve.

I am aware that an elliptical side spring returning upon itself into a C-spring at both ends, passing under the axle and head-block respectively, and fastened to shackles resting thereon by a bolt, has been in use, as shown in Patent No. 211,045, to Robert Porter.

I am also aware that other double C side springs have been long in use, said springs being firmly attached to a side bar and connected at top by straps, upon which the vehicle-body rests. These I do not claim; but What I do claim as my invention is—

1. The combination of a long side spring of elliptical form, having its rear end recurved into a C-spring, the point of attachment of which at its C end is nearer its center in a right line than that of its opposite end, with a thorough-brace or link attachment to running-gear having a rigid side bar, substantially as set forth.

2. In the construction of the C portion of the spring, the continuation of the second leaf or spring, B, into the long C-spring, having its attachment by means of the thorough-brace d to axle E, and continuing the under leaf or spring, A, into a shorter C-spring fitting upon and re-enforcing the C portion of spring or leaf B, substantially as set forth.

In testimony whereof I have signed my name to this specification in the presence of two subscribing witnesses.

EDWARD SAWYER.

Witnesses:
J. H. ADAMS,
E. PLANTA.